May 15, 1956

F. DÖLLING ET AL
TIGHTENING-PULLEY MOUNTING FOR THE LOWER TAPE OF TAPE DRAWING ROLLERS
Filed March 31, 1951

2,745,145

Inventors
F. Dölling
C. L. Kümpers
By Glascoe Downing Seebold
Attys.

United States Patent Office 2,745,145
Patented May 15, 1956

2,745,145
TIGHTENING-PULLEY MOUNTING FOR THE LOWER TAPE OF TAPE DRAWING ROLLERS

Fritz Dölling and Carl Ludwig Kümpers, Rheine (Ems), Germany, assignors to F. A. Kumpers K. G., Rheine, Westphalia, Germany Application March 13, 1951, Serial No. 215,208

2 Claims. (Cl. 19—131)

For single-tape or double-tape drawing rollers a tightening pulley is used for tightening the lower tape, the frame for the mounting of the tightening pulley being rotatably suspended on a rod. The disadvantage of this type of construction is that it is impossible to prevent the tightening pulley from falling out of its mounting while the drawing rollers are being tended. Moreover with tightening pulley mountings of this kind inconvenience is caused by the fact that the tightening pulley is liable to be stopped by accumulation of fly in the slot-shaped guide for the pivots of the tightening pulleys. This causes the tape also to stop and to form a loop, which does not undo itself spontaneously, and which in most cases causes the tape to break. To obviate these disadvantages, tightening pulley mountings in the form of a right-angled slot guide have been proposed, in order to prevent the tightening pulley from falling out. Also, tightening pulleys constructed in two parts, consisting of shaft and pulley, have become known. It is found that tightening pulleys of this kind do not fall out; but the problem of the accumulation of fly at the bearing point and the disadvantage associated therewith remains unsolved.

These disadvantages are removed by this invention, which consists in the fact that the tightening pulley is guided by a frame which is fixed to the turner bar. In the preferred embodiment of the invention provision is made for the tightening pulley to rest freely with each of its end pivots on the upper side of the frame fastened to the turner bar.

The invention is explained by means of an example in the accompanying drawings, in which.

Figures 1, 2:
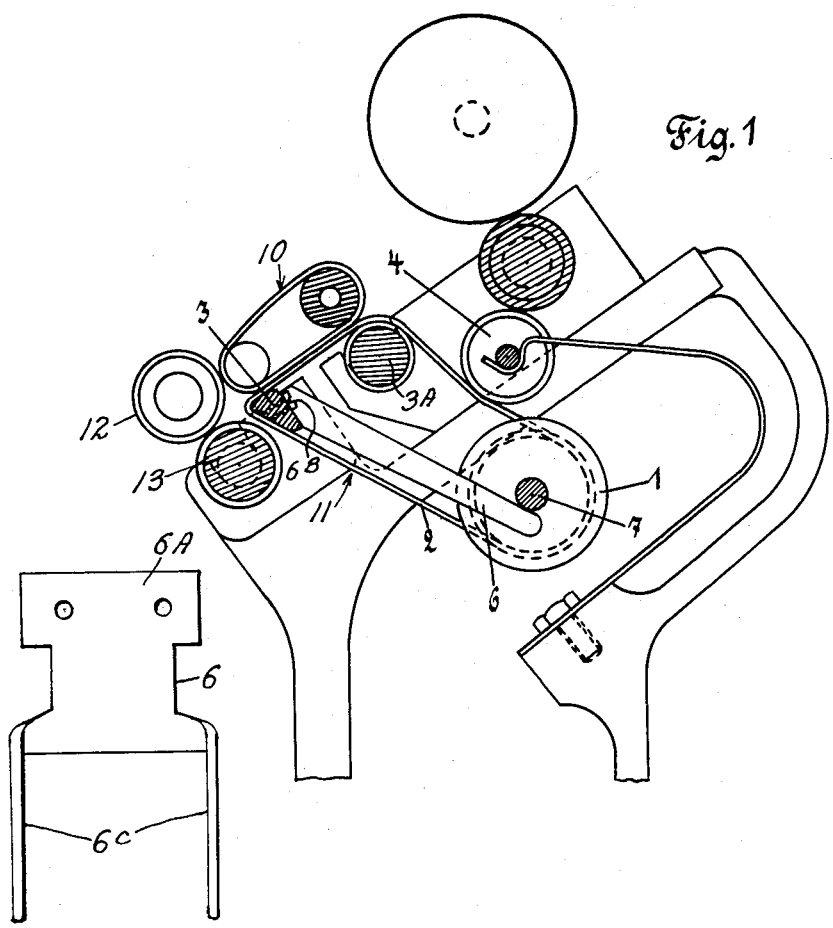
Figure 1 illustrates an embodiment according to the invention.
Fig. 2 is an end elevation of the guide frame for the tightening pulley.

In Figure 1, an upper feed assembly 10 preferably of the endless tape or band type, a lower feed assembly 11 and upper and lower drafting rollers 12 and 13 are depicted. The lower feed assembly includes a tightening pulley or roller 1, an endless tape 2, a turner bar 3 and a feed roller 3A. A rear clearer 4 is provided for the tape 2. The tightening pulley is guided on a frame 6, which is fastened to the turner bar 3 and extends downward therefrom and to the rear. As shown in Fig. 2, the frame 6 comprises a base plate 6A secured to the rear face of the turner bar 3 by bolts or the like 6B and a pair of spaced apart substantially parallel arms 6C. Trunnions 7 of the said pulley or roller 1 rest on the upper face or edge of the spaced arms 6C as illustrated in Fig. 1. By this simple guiding and mounting of the tightening pulley all accumulation of fly, such as occurs in the case of slot guides of the tightening pulleys which have been usual heretofore, is avoided. The new mounting enables the tightening pulley to produce the required tightening effect on the lower tape satisfactorily and without interference.

As may be seen, with the present invention, the whole area behind and beneath the drawing rollers becomes clear, besides which a particularly advantageous mounting of the rear clearer 4 is rendered possible. The clearer can now be mounted on its end pivots, and as a result of which it can be inserted and removed easily and conveniently.

A further important advantage of the invention is that the number of parts of a set of drawing rollers is considerably less than with the constructions previously known.

We claim:

1. In a machine for drawing fibrous materials, upper and lower drawing rollers, an endless upper feed unit, an endless band below the upper unit defining a lower feed unit, a turner bar adjacent the periphery of the lower drawing roller, a feed roller, and a tightening roller over which the band is movable and means for mounting the tightening roller, said mounting means comprising a rigid base plate secured to the face of the turner bar remote from the lower drawing roller, a pair of spaced apart parallel arms attached to the base plate and depending from the base plate at an angle towards the rear of the machine, each of said arms being provided with a continuous unbroken upper surface extending from the base plate to the free ends of the arms and the said tightening roller resting upon and being guided by the unbroken upper surfaces of the parallel arms whereby the tightening roller may move up or down the said arms freely to adjust the tension of the endless band.

2. A machine for drawing fibrous materials as defined in claim 1 wherein said tightening roller is provided with a trunnion at each end thereof, each of the trunnions resting upon the unbroken upper surface of the respective parallel arms and being guided by such arms.

References Cited in the file of this patent

UNITED STATES PATENTS

| | | |
|---|---|---|
| 1,448,191 | Butler | Mar. 13, 1923 |
| 1,644,747 | Roth | Oct. 11, 1927 |
| 1,804,968 | Blake | May 12, 1931 |
| 2,237,364 | Schiessler | Apr. 8, 1941 |
| 2,582,213 | Walsh | Jan. 8, 1952 |

FOREIGN PATENTS

| | | |
|---|---|---|
| 246,782 | Great Britain | Feb. 11, 1926 |
| 267,667 | Switzerland | Apr. 15, 1950 |